(No Model.)
S. J. MILLER.
PORTABLE STACKING FRAME.
No. 320,153. Patented June 16, 1885.
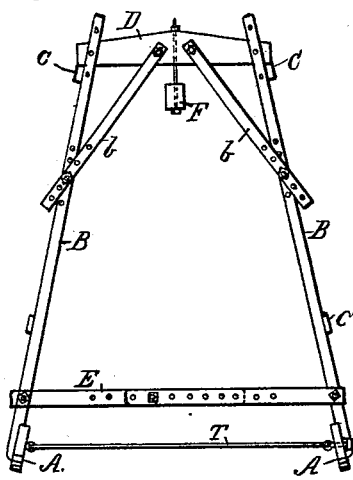
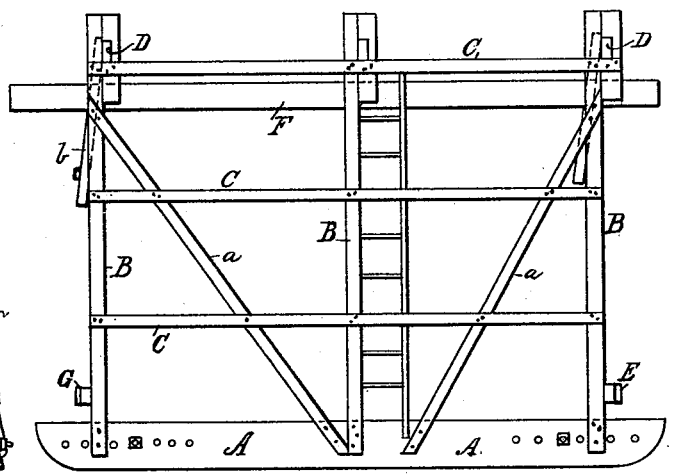
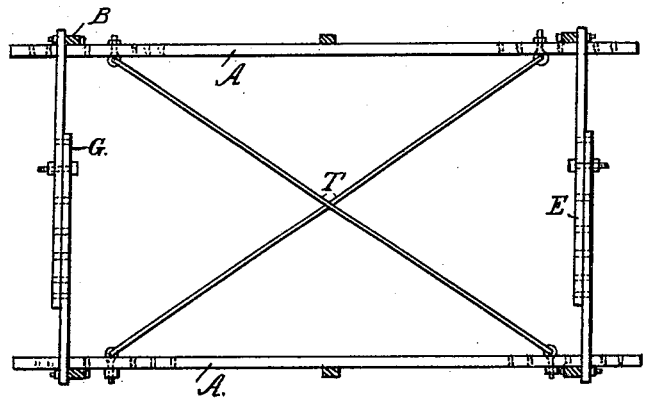

0
UNITED STATES PATENT OFFICE.

SYLVESTER J. MILLER, OF MILLERSVILLE, ILLINOIS.

PORTABLE STACKING-FRAME.

SPECIFICATION forming part of Letters Patent No. 320,153, dated June 16, 1885.

Application filed November 8, 1884. (No model.)

*To all whom it may concern:*

Be it known that I, SYLVESTER J. MILLER, a citizen of the United States, residing at Millersville, in the county of Christian and State of Illinois, have invented a new and useful Improvement in Portable Stacking-Frames, of which the following is a specification.

My invention relates to a portable stacking-frame to be used in stacking hay or grain or straw with a horse hay-fork.

My invention will first be described, and then pointed out in the claims.

In the drawings, Figure 1 is a side view of my invention, and Fig. 2 is an end view. Fig. 3 is a plan view of the bottom part.

A A are the sills. B B are the posts. C C are the side ties. D D are the cross-ties at the tops of the posts. E is a cross-tie at the front end of the sills. F is the rail for the hay-fork carriage to travel on. T T are tie-rods to secure the sills and hold them at any width desired. *b b* are cross-braces. *a a* are side braces. The sills, posts, cross-ties, and side ties are of any suitable lumber and of such dimensions as may be desired. Planks are used for the sills A, and the ends are rounded to resemble a sled-runner, so as to be easily dragged over the ground. The posts B are secured at their lower ends to the sills and at their upper ends to the cross-ties D, and braces *b* are secured to both the posts and the cross-ties to stiffen the frame and prevent it from swaying crosswise. As the distance between the sills is varied the length of the braces (between their couplings) will be varied; and hence a series of holes is provided at either end of the braces, (a series of holes in the post or in the cross-tie would accomplish the same purpose,) and bolts inserted through holes in the post and the brace, and through the brace and the cross-tie, will secure the parts together and brace the frame at the upper part at any width desired. The side ties, C C, are secured to the posts to prevent the frame from swaying longitudinally, and side braces, *a a*, reaching from the upper part of a post to a sill, (or a side tie,) are provided to still further stiffen the frame in that direction. The cross-tie E is formed of two pieces, secured to the front ends of the sills and allowed to lap by each other, and holes in both pieces are provided to receive a bolt (inserted through both pieces) to secure the two pieces together and hold the sills at any distance apart that may be desired, a series of holes in either or both of the pieces being provided. The width between the sills may be varied by removing the bolt and sliding the pieces together until some other two of the holes are brought together so as to receive the bolt. The iron ties T T are secured to diagonally-opposite ends of the sills, when the frame is to be moved from place to place, so as to avoid racking the frame and tearing it apart. A removable cross-tie, G, is secured to the sills at their rear ends for the same purpose. When the frame is in use, these tie-rods and the cross-tie at the rear end of the sills are removed, so that the frame may be drawn away from the completed stack. The rail F is suspended from the cross-ties D and extends the whole length of the frame and may project beyond either end.

I claim—

1. The combination of sills A, posts B, cross-ties D, and braces *b*, the latter being adjustably secured to allow the distance between the sills to be varied.

2. The combination, in a stacking-frame, of posts B, cross-ties E G, sills A, and the diagonally-arranged, adjustable, and removable tie-rods T.

SYLVESTER J. MILLER.

Witnesses:
C. H. WOOD,
J. W. KEYES.